Nov. 6, 1956 W. R. SWANSON 2,769,468
LOG BARKER HAVING FLOP-OVER CUTTERHEAD
Filed Jan. 13, 1953 7 Sheets-Sheet 4
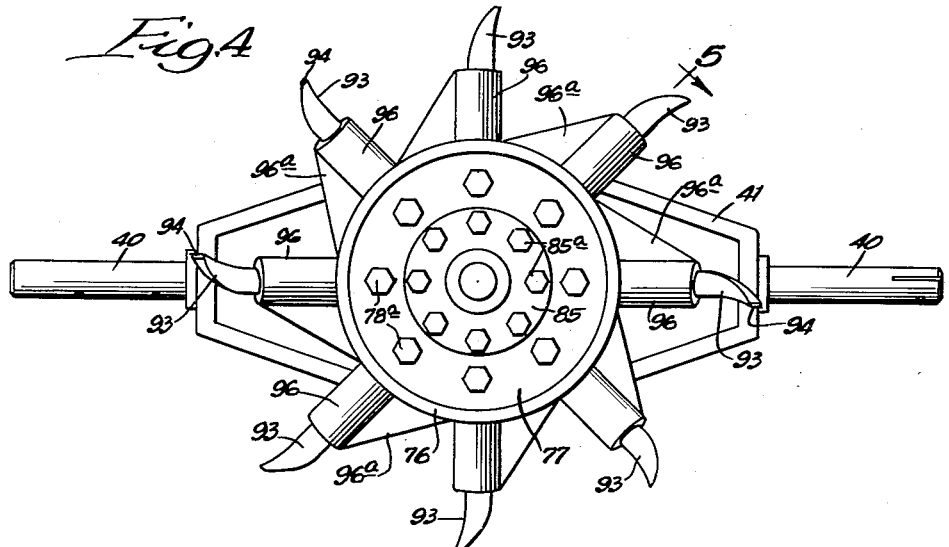
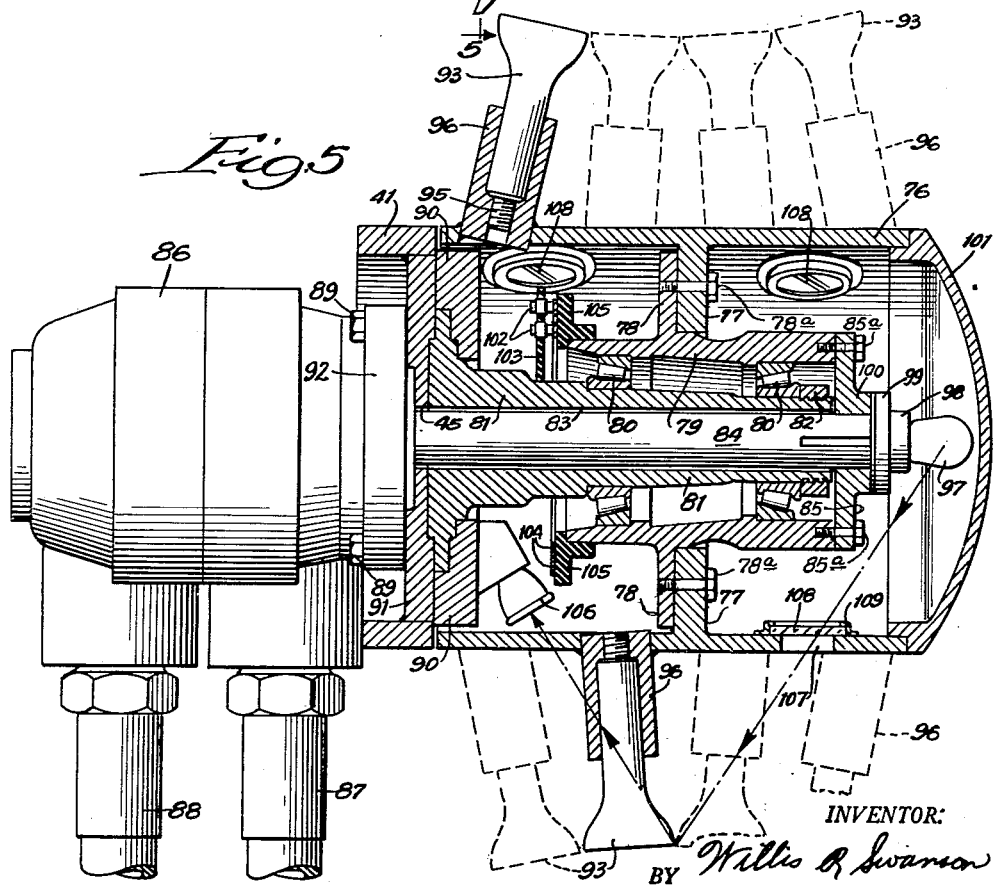
INVENTOR:
Willis R. Swanson
BY Dawson, Tilton & Graham,
ATTORNEYS.

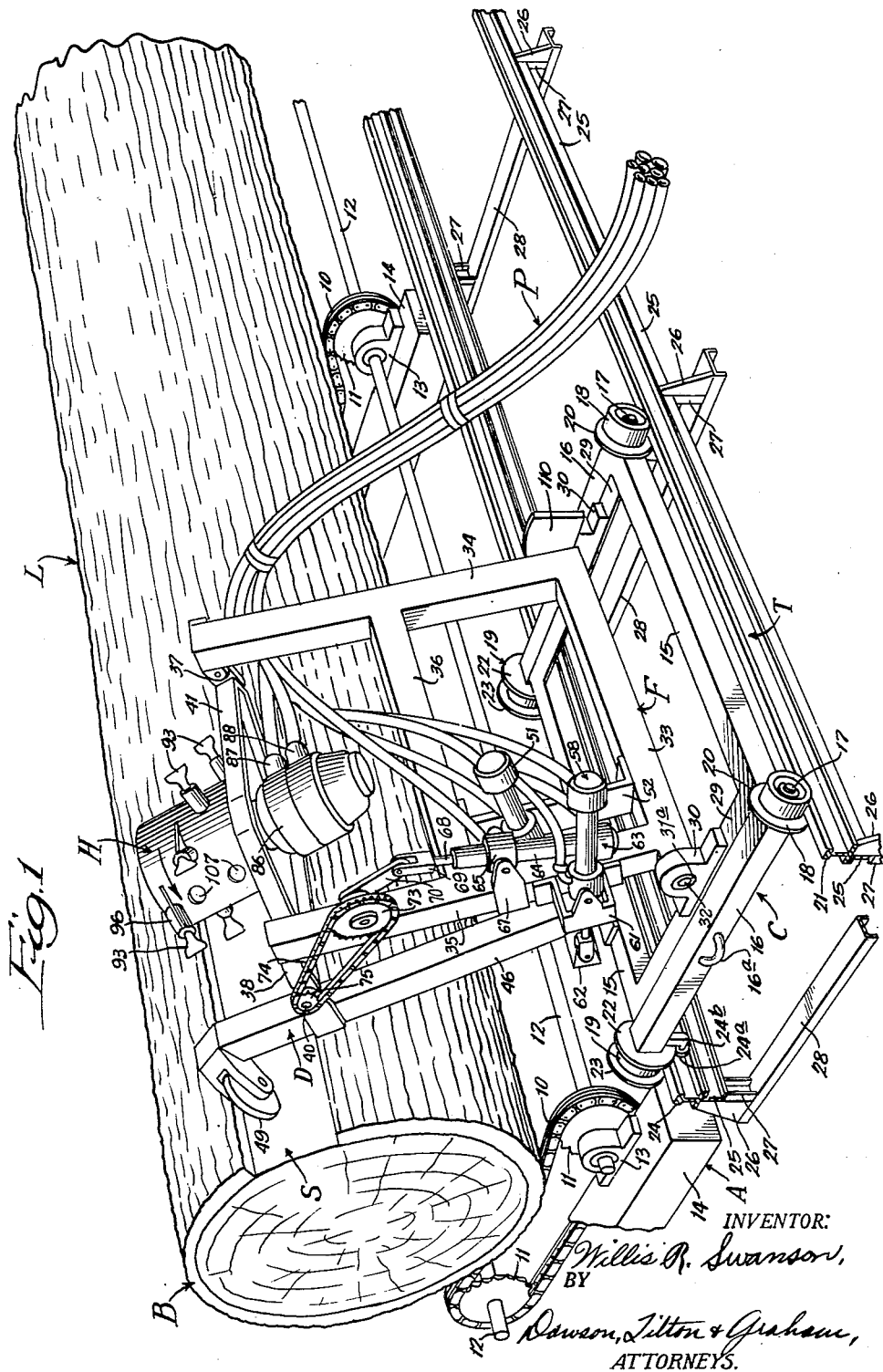

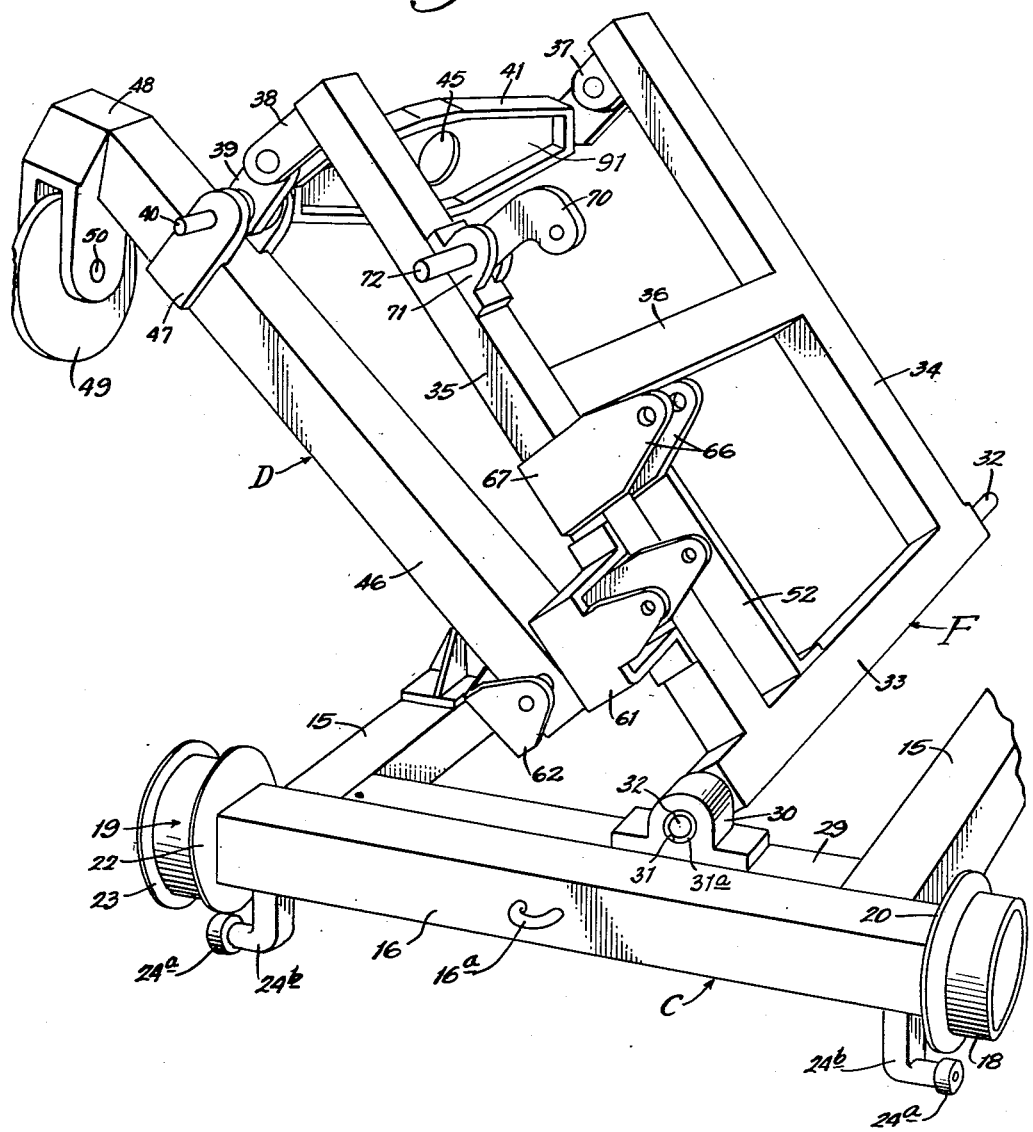

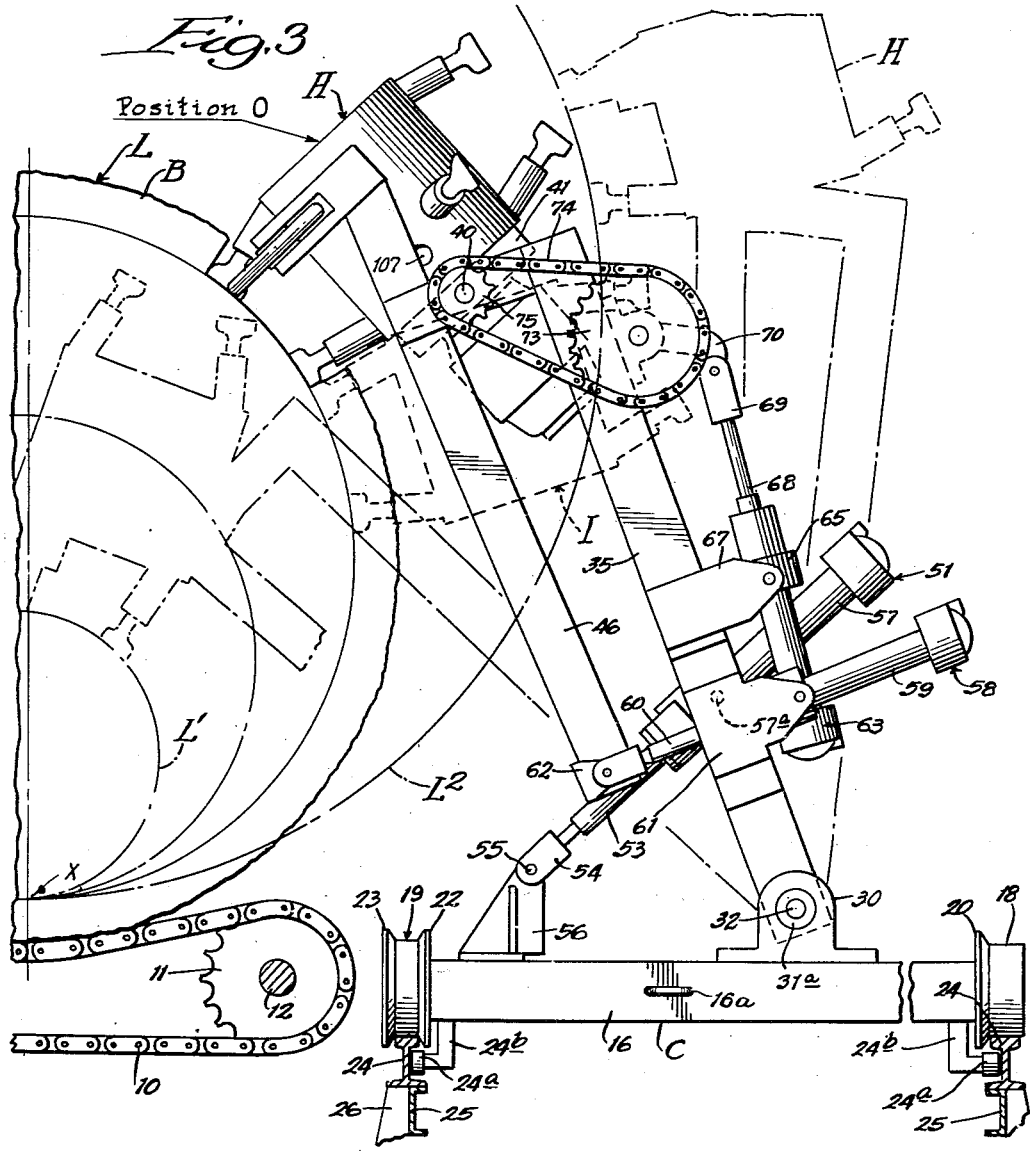

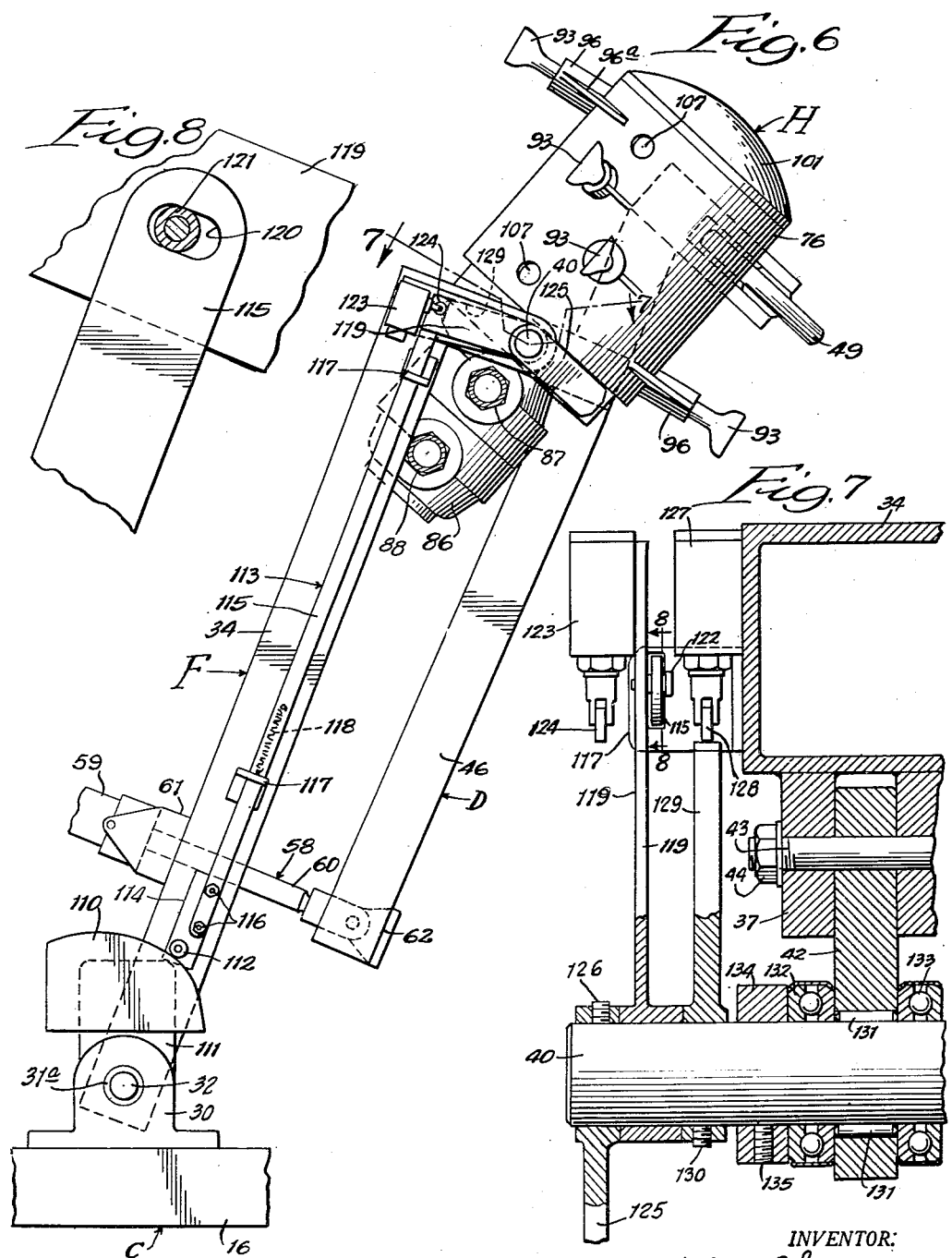

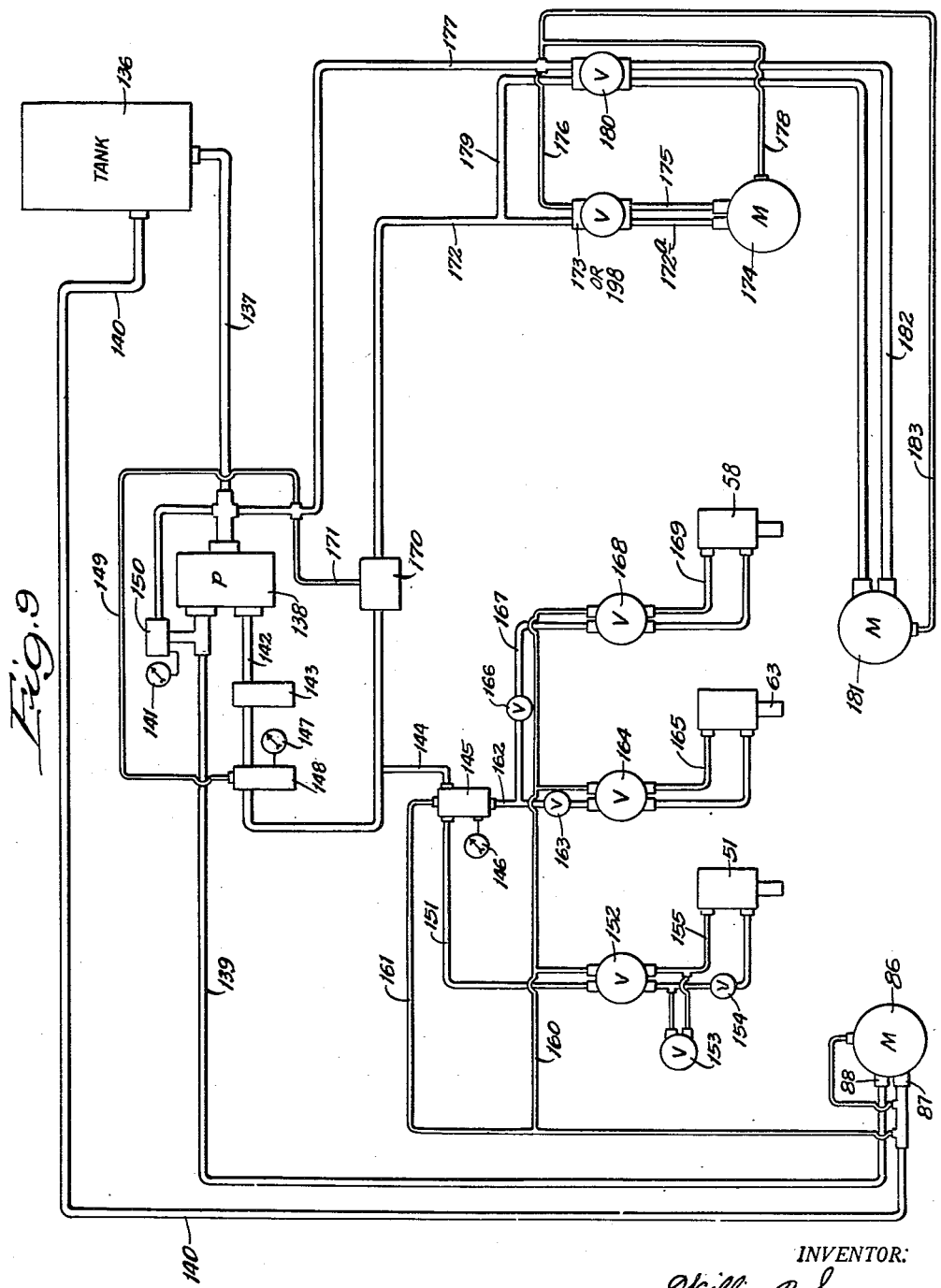

Nov. 6, 1956 W. R. SWANSON 2,769,468
LOG BARKER HAVING FLOP-OVER CUTTERHEAD
Filed Jan. 13, 1953 7 Sheets-Sheet 7
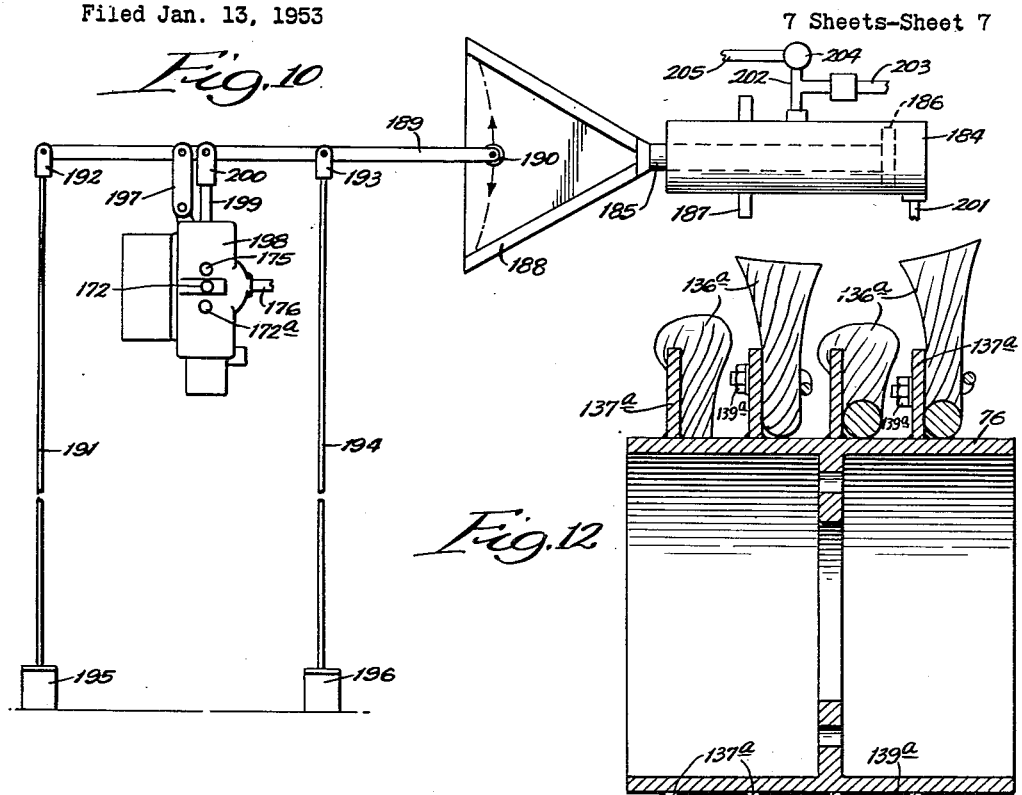
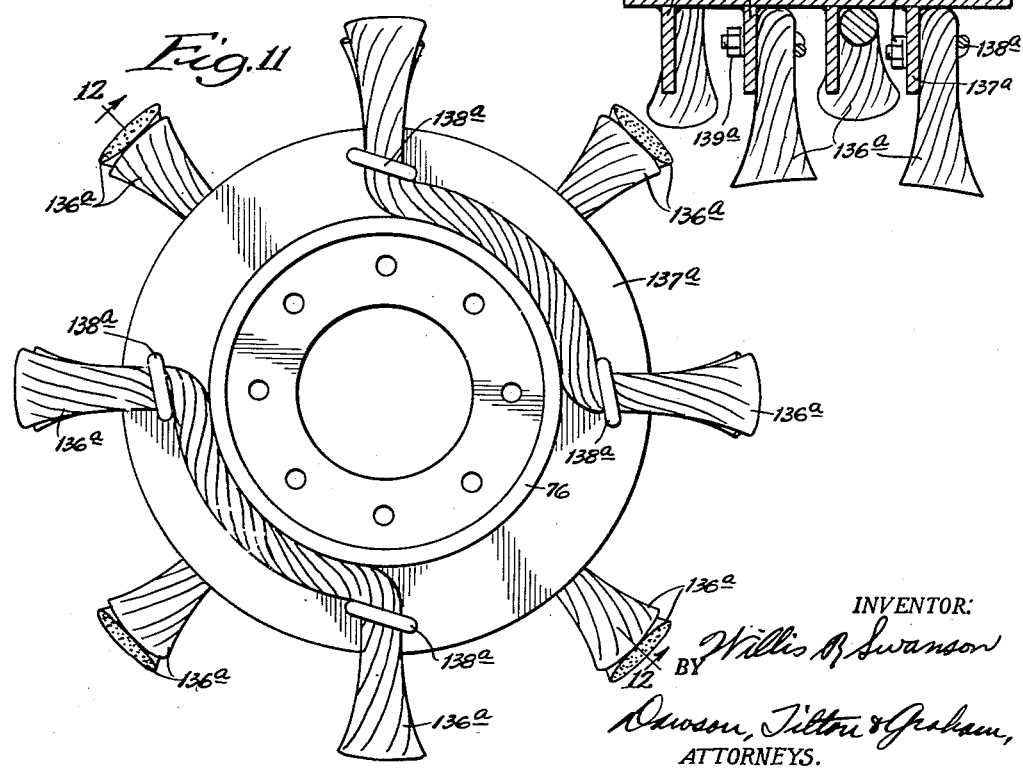
INVENTOR:
Willis R. Swanson
BY Dawson, Tilton & Graham,
ATTORNEYS.

United States Patent Office 2,769,468
Patented Nov. 6, 1956

2,769,468

LOG BARKER HAVING FLOP-OVER CUTTERHEAD

Willis R. Swanson, Wichita, Kans., assignor to The Rounds & Porter Lumber Company, Inc., Wichita, Kans., a corporation of Kansas Application January 13, 1953, Serial No. 330,946

17 Claims. (Cl. 144—208)

This invention relates to a log barker, and in particular to log-debarking apparatus wherein the bark is removed in chips and in which heavy logs having various diameters are readily accommodated.

An object of the invention is to provide log-debarking apparatus in which the cutting head is moved longitudinally of a log being barked whereby the typical irregularities in the cross-sectional shape of the log are avoided because the cuttinghead moves along straight or generally curved paths that are typical of the longitudinal shape of a log surface. The result is the attainment of higher transverse speeds and smaller and more gradual depth control of the cutter head than is possible in conventional barkers. Another object of the invention is to provide means arranged to travel in the cutting path of the cutterhead to guide the depth of the cutterhead. Adjacent longitudinal surfaces of the log are substantially similar in contour and the depth-control movements are primarily made to accomplish small corrections in the irregularities of these adjacent surfaces, and for this purpose it is preferable that a guide wheel be provided that travels behind the cutterhead along a previously debarked surface of the log. Another object of the invention is to provide photoelectric means arranged within the cutterhead whereby differences of color or reflection characteristics between the bark and wood of a log are used to automatically control the depth of the cutterhead so that substantially all of the bark is removed without removing excessive amounts of wood.

Still another object of the invention is the provision of means for automatically governing the speed of the longitudinal movement of the cutterhead relative to the log to fit the depth and condition of the bark. Preferably the log-debarking apparatus is of relatively light weight and the automatic speed control is practically accomplished because the light weight of the apparatus permits rapid changes in velocity with economically small actuating forces. A further object of the invention is to automatically adjust the cutting surface of the cutterhead so that it remains substantially parallel to the surface of the log irrespective of the log diameter. This feature in conjunction with the depth control arrangement previously referred to permits accommodation of logs having elliptical, heart-shaped or other irregular cross sections.

Valuable chemicals can be secured from the bark of timber by solvent or leaching action on the bark. For example, valuable waxes may be extracted from the bark of certain timber. The extraction processes are carried on more efficiently and more economically where the bark pieces or particles are of relatively large size so that there is not present execssive amounts of small bark particles which tend to clog the filters, impede separation of the chemicals from the bark, and otherwise interfere with the extraction process. A further object of the invention, therefore, is to provide a cutterhead in which the shape of the cutters, the rotational speed, and the longitudinal speed of the cutterhead is controlled so as to generate bark chips of suitable shape and thickness to meet the requirements of extraction processes.

Still another object of the invention is the provision of means for removing the bark from logs in shredded form to produce directly a fluffy insulating material without the necessity of using large and specialized equipment. Still a further object of the invention is to provide a cutterhead and associated apparatus moving the cutterhead longitudinally of the log and in which the cutterhead is positioned at one predetermined setting when the head is moved in one direction while when the cutterhead is moved along the log in the opposite direction the cutterhead is flopped over a controlled amount regulated by the log diameter to cut a second swath of bark from the log without the need of rotating or otherwise moving the log. Additional objects and advantages will appear as the specification proceeds.

An embodiment of the invention is illustrated in the drawings, in which—

Figure 1 is a perspective view of the log-debarking apparatus and shows a log, in the first stage of the bark-removal operation; Fig. 2 is a persepective view of the carriage and adjustable frame elements and in which all of the motors, controls and cutterhead are removed; Fig. 3 is an end view in elevation of the apparatus and in which various positions are illustrated in phantom to show the accommodation of logs having different diameters; Fig. 4 is a front view in elevation of the cutterhead and in which the forward cover plate is removed; Fig. 5 is a longitudinal sectional view of the cutterhead taken on the line 5—5 of Fig. 4; Fig. 6 is an end view of the frame assembly illustrated in Fig. 3 but taken from the opposite end; Fig. 7 is a sectional view taken on the line 7—7 of Fig. 6; Fig. 8 is a sectional view taken on the line 8—8 of Fig. 7; Fig. 9 is a schematic diagram of the hydraulic motor and control circuits preferably used with the log-barker apparatus; Fig. 10 is primarily a diagrammatic view of control apparatus for automatically controlling the speed of longitudinal movement of the cutterhead relative to a log in accordance with the hardness and thickness characteristics of the bark; Fig. 11 is a front view in elevation of a modified form of cutterhead in which brushes are used rather than cutters or knives; and Fig. 12 is a longitudinal sectional view of the modified cuttinghead taken on the line 12—12 of Fig. 11.

It is believed that the log-barker apparatus may best be understood by first referring to Fig. 1 wherein the apparatus is illustrated in perspective and in position to remove bark from a log. The log illustrated is designated generally with the letter L and has an outer layer of bark B from which a swath S of bark has been removed. The log L is mounted upon a log support A and the support A is capable of rotating the log a controlled amount as will be hereinafter described. The bark-removal apparatus consists generally of a carriage C adapted to move longitudinally of the log L upon a track T. Pivotally mounted upon the carriage C is a tilt frame F that is movable toward and away from the bark surface of the log. The positioning of the frame F with respect to the surface of the log is determined by a depth-control unit D. Mounted upon the tilt frame F is a cutterhead H that is rotatable so as to move the knives thereof into cutting engagement with the bark B of the log. The head H is also mounted upon the frame F so as to be pivoted or flopped over as is illustrated in Fig. 3 and as will be subsequently described, so as to cut two swaths S from the log without requiring a partial rotation of the log and without requiring the carriage C to return to its initial position while the cutterhead remains idle. The hydraulic cylinders and motors are also illustrated in Fig. 1.

Log-supporting apparatus

The log L may be mounted upon any suitable log-supporting apparatus A that is preferably operative to rotate the log through controlled angular distances to change the bark surface confronted by the cutterhead H so that the entire log may be debarked. The log-supporting apparatus A illustrated consists of a plurality of chains such as the sprocket chains 10 which are entrained about sprockets 11. The sprockets 11 are secured to longitudinally-extending shafts 12 that are mounted at intervals for rotation in bearings provided by collars 13. The collars 13 are in turn rigidly mounted upon transverse supports 14. Preferably at least one of the shafts 12 and conceivably both of the shafts 12 are rotated by a suitable motor device which may be a conventional hydraulic motor. Control of the motor is provided so that the log L mounted upon the log support A may be rotated a predetermined amount. A specific motor connection for this purpose is not illustrated since any conventional and well-known gear train may be employed; however, the motor 181 is illustrated in the schematic diagram of Fig. 9.

Reciprocating carriage and its trackway

The carriage C consists of a pair of side members 15 having rigidly secured thereto a pair of end members 16. Any type of rigid connection between the side members and end members may be used and, for example, the members may be welded to form an integrated peripheral frame member. Mounted upon the ends of the members 16 upon suitable axles 17 are wheels 18 and 19. The wheels 18 are each equipped with an inner flange 20 and the wheels ride upon a rail 21. The wheels 19 are equipped with inner flanges 22 and outer flanges 23 and ride upon a rail 24. The inner flanges 20 of the wheels 18 and the flanges 22 and 23 of the wheels 19 abut the edges of the rails 21 and 24 and confine the carriage thereon. If desired, the carriage may be equipped at each corner with a hold-down wheel 24a rotatably mounted on brackets 24b for engaging the underside of the rails to hold the carriage thereon. The carriage C may be equipped with arcuate members 16a mounted upon the ends 16 of the carriage to provide a securing device for attaching a cable to the carriage. The carriage may be moved longitudinally along the track T by means of a cable and motor drive. Any well-known and conventional cable and motor drive assembly (see motor 174 illustrated in the schematic diagram in Figure 9) may be used to provide the longitudinal movement of the carriage.

The track T includes the rails 21 and 24 and the mountings therefor. The rails 21 and 24 are rigidly secured to channel members 25 and brackets 26. The channels 25, which are horizontally disposed, are supported on short vertical channel-shaped members 27 and together the height of the channels 25 are members 27 is equal to the height of the brackets 26. The brackets 26 and the members 27 in turn are mounted upon transverse supports 28 that may be channel-shaped as illustrated. All of the described members may be welded together to provide a rigid track structure upon which the carriage C rides, or if desired, other securing means may be used. Preferably the track T is somewhat longer than a log L supported upon the log support A, so that the carriage C may travel beyond each end of the log. This is desired so that the cutterhead H may be flopped over, as will be later described, without interference by the log L and without the need for tilting the frame F away from the log to provide clearance for this operation.

Tilt-frame support for cutterhead

Referring in particular to Figs. 1 and 2, it is seen that the carriage C is equipped with a pair of supports 29 rigidly secured at opposite ends thereof to the side members 15 and along outer sides thereof to the end members 16. Rigidly mounted upon the support plates 29 are trunnions 30 having bores 31 and bearings 31a therethrough that rotatably receive an axle 32. The axle 32 provides a mounting for the tilt frame F and extends transversely thereof through the base member 33 of the frame. Formed rigidly with the base member 33 are a pair of uprights 34 and 35 reinforced intermediate their ends by a transverse member 36. It is apparent that the tilt frame F is therefore free to pivot about the axis provided by the trunnions 30.

At their upper ends each of the members 34 and 35 is equipped with a clevis 37 and 38. The clevis 38 has rigidly pinned thereto a link 39 that pivotally receives the axle 40 of yoke 41. The axle 40 is rigidly secured to the yoke 41 so that rotation of the axle provides rotation of the yoke. As will be seen best in Fig. 7, the clevis 37 is equipped with a link 42 secured thereto by a bolt 43 and nut 44. The link 42 pivotally receives an axle projecting from the opposite end of the yoke 41 and which will also be designated by the numeral 40. Together the axle segments 40 may be considered as being and will often be referred to as the yoke axle and the pivotal axis of the yoke. The yoke 41 is equipped with an aperture 45 that facilitates mounting of the cutterhead and motor therefor upon the yoke.

Cutter-depth control unit

The tilting of the frame F toward the periphery of a log L is limited by the depth control D. The depth control D includes an arm 46 having rigidly secured thereto near its upper end a bifurcated connector member 47. The member 47 is provided with an aperture therethrough that receives the axle 40, and the link 39 is positioned between the spaced ends of the bifurcated member. Adjacent its upper end the arm 46 is equipped with a downwardly-extending clevis 48 having mounted between the spaced prongs thereof a depth control wheel 49. The wheel 49 is rotatably mounted upon an axle 50 received in apertures provided by the clevis 48. The arm 46 is free to pivot about the axle 40 and its pivotal position with respect to this axle and the tilt frame determines the position of the tilt frame with regard to its nearness to the bark surface of a log L. The lower end of the arm 46 is free insofar as the showing of Fig. 2 is concerned but in assembly is connected with a hydraulic cylinder as will be later described.

Tilt-frame operating mechanism

The frame F is pivoted about the axle 32 by means of a hydraulic cylinder 51 that is seen best in Figs. 1 and 3, while the mounting of the cylinder upon the frame F will be considered also with reference to Fig. 2. The cylinder 51 is pivotally mounted between the upright member 35 of the frame F and an inner bracket 52 rigidly mounted upon the base member 33 and intermediate transverse member 36 of the frame F. The pivotal mounting between the members 35 and 52 permits the cylinder 51 to be angularly oriented as may be required by the angle of tilt of the frame F. At its inner lower end the cylinder 51 is equipped with a plunger 53 that carries at its outer end a bifurcated connector member 54. The connector 54 is pivotally connected by a pin 55 to a bracket 56 that is fixedly mounted upon the inner side member 15 of the carriage C. It is seen, then, that upon actuation of the cylinder 51 its casing portion 57 moves axially with respect to the plunger 53 which is restrained against axial movement by its connection to the bracket 56. Since the casing 57 is fastened by its pivot to the tilt frame F, the tilt frame is thereby pivoted about its pivotal axis through the trunnions 30 mounted upon the carriage. The pivotal mounting of the casing 57 is provided by pivotally supporting the same upon pins rigidly fixed to the members 35 and 52, one of such pins being shown in Fig. 3 by the numeral 57a.

The inward tilting of the upper end of the frame F toward the log L is limited by abutment of the depth-control wheel 49 with the periphery of the log. The exact positioning of the upper end of the frame F relative to the surface of the log may therefore be determined by adjusting the position of the depth-control wheel 49 about its pivotal axis 40 with respect to the upper end of the tilt frame F. This control is provided by the use of a hydraulic cylinder 58 that will also be described with reference to Figs. 1 and 3, while the mounting for the cylinder may best be seen in Fig. 2. The cylinder 58 is equipped with a casing 59 that is pivotally mounted between the spaced ears of a partly U-shaped bracket construction 61 rigidly carried upon the outer side of the upright side member 35 of the tilt frame F. The cylinder 58 is also equipped with a plunger 60 having at its end a bifurcated connector member that is pivotally secured to an L-shaped bracket 62 which in turn is rigidly mounted upon the arm 46 of the depth control unit D. It will be apparent that upon actuation of the cylinder 58 the plunger 60 thereof will move axially with respect to the cylinder casing and the tilt frame F and swing the lower end of the arm 46 so as to pivot the arm about the axle 40 and thereby change the position of the depth wheel 49 relative to the upper end of the tilt frame F.

*Cutterhead flop-over mechanism*

It is shown clearly in Fig. 1 that the cutting head H is carried by the yoke 41 and it is desired to partially rotate the yoke 41 so that the cutting edges of the cutterhead H are repositioned with respect to the surface of the log L upon the movement of the carriage in a reverse direction. That is to say, in the illustration of Fig. 1 the carriage C will be moving toward the right and the cutterhead H will be removing bark from the log L to provide the swath S. However, upon the return movement of the carriage C, which will be to the left as seen in Fig. 1, the cutting head H will be flopped over (as is illustrated in phantom in Fig. 3) so that a second swath of bark is removed from the log L upon the return movement of the carriage C and without the necessity of rotating the log L. To accomplish this flop-over, a hydraulic cylinder 63 is employed. The cylinder 63 is equipped with a casing 64 having mounted thereon a collar 65. The collar 65 is pivotally mounted between the extended ears 66 of a clevis 67 which is rigidly carried upon the side member 35 of the frame F. The cylinder 63 is equipped with a plunger 68 having a bifurcated connector member 69 at its upper end that is pivotally connected to a crank 70. As will be seen best in Fig. 2, the crank 70 can swing between the forked ends of a clevis 71 and is secured to an axle 72 pivotally mounted within appropriate apertures in the clevis 71. Referring again to Figs. 1 and 3, it is seen that the axle 72 carries on its outer end a sprocket 73 having entrained thereabout a link chain 74. The chain 74 extends about a sprocket 75 of reduced diameter and the sprocket 75 is secured to the axle 40 so that the axle rotates upon rotational movement of the sprocket 75. In the same manner, the sprocket 73 is secured to the axle 72. Upon actuation of the cylinder 63 the plunger 68 thereof moves axially to pivot the crank 70 and rotate the axle 72. The sprockets 73 and 75 are thereby rotated through a predetermined angular distance whereby the yoke 41 is partially rotated to flop over the cutterhead H.

*Cutterhead construction*

The cutterhead H may be seen best in Figs. 4 and 5. The cutterhead H includes a cylindrical casing member 76 having intermediate its ends an inwardly-extending annular flange 77. The flange 77 is mounted by means of cap screws 78a upon a complementary laterally-extending flange 78 with which a hub 79 is equipped. The hub 79 in turn is supported upon bearings 80 for rotational movement about a central stationary sleeve 81. It is seen that shoulders lock the inner bearing 80 in position while an adjustable nut 82 threadedly received upon the outer end of the sleeve 81 secures the outer bearing 80 in the desired position.

The sleeve 81 has a longitudinally-extending passage 83 therethrough that rotatably receives a shaft 84 having rigidly secured thereto adjacent its end an annular flange 85 that is also rigidly secured by means of cap screws 85a to the hub 79. A hydraulic motor 86 having inlet and outlet conduits 87 and 88 rotates the shaft 84 and it is seen that this rotation through the hub 79 rotates the outer cylindrical casing 76 of the cutterhead. The cutterhead and motor drive therefor are mounted upon the yoke 41 by means of studs 89 that are rigid with an inner flange 90 and draw the same into tight gripping relation with the inner flanged portion of the sleeve 81 and the central member 91 of the yoke 41 and at the same time draw the annular connector flange 92 of the motor 86 against the central yoke member 91. It is seen that the inner member 90 and the annular extension of the sleeve 81 are equipped with suitable mating shoulders to properly align the sleeve 81 with respect to the rotatably mounted shaft 84.

Mounted upon the peripheral surface of the cylindrical casing 76 are a plurality of cutters or knives 93. The knives 93 are aligned in substantially parallel rows spaced longitudinally of the casing 76. As may be seen by referring to Fig. 1, the cutters 93 are staggered and substantially encompass the entire surface of the casing 76. Of the four rows of cutters illustrated, it is apparent that the cutters of the inner rows have cutting or biting teeth or surfaces 94 that are substantially parallel with the surface of the casing 76. The outer rows of cutters, however, are angularly disposed so that they tip inwardly and have the highest point of the cutting surface adjacent the ends of the casing 76. The general configuration of the cuting surfaces provided by all of the rows of cutters is therefore generally arcuate and conforms substantially with the peripheral form of a log.

At their inner ends the cutters 93 are equipped with a reduced extension 95 that is threaded and is threadedly received within a threaded passage provided by a mounting member 96. The member 96 is also provided with an enlarged passage coaxial with the reduced threaded passage and receiving the enlarged cylindrical portion of the cutter 93. Desirably, the shoulder provided by the meeting of the enlarged and reduced passages of the member 96 is axially related thereto so that upon screwing of the cutters 93 to their innermost position they are properly oriented with respect to the rotatable cylindrical casing 76. Fig. 5 also makes it apparent that the outer mounting members 96 are angularly disposed relative to the casing 76 while the inner members are generally perpendicular to the casing surface. The members 96 are mounted upon the casing rigidly by means of welding, as illustrated, and to add rigidity thereto each member 96 is equipped with a brace 96a. If desired, some other attaching means may be employed.

*Photoelectric-cell control for cutter-depth control unit*

It has previously been brought out that the angular disposition of the tilt frame F relative to a log L is determined by the angular positioning of the depth-control unit D. Generally, the positioning of the depth-control member may be done manually in response to visual indications through actuation of the hydraulic cylinder 58 through suitable control units. It is, however, frequently desirable to provide automatic depth control of the cutter-head so that all of the bark is removed from a log uniformly while at the same time excessive wood is not chipped from the log. Illustrated in Fig. 5 is an automatic means for accomplishing automatic depth-control adjustment of the cutterhead. The automatic means I employ consists of a light source and a photoelectric pick-up cell. The light source may be a bulb 97 mounted in a socket 98 rigidly secured by means of a flange 99 to a boss 100 with which the annular member 85 is provided.

The light source will thereby rotate with the shaft 84 and casing 76; although this is not necessary, but does provide a ready means for mounting the light source. The light 97 is protected from flying chips by a cover 101 secured to the outer end of the casing 76. A suitable source of current for actuating the light is provided through brushes 102 mounted upon an insulator 103 carried by the stationary sleeve 81. Suitable wires may be brought through the yoke 41 and stationary sleeve 81 and to the brushes 102. The brushes 102 frictionally engage pickup rings 104 mounted upon an insulator 105 carried by the hub 79. Since the insulator 105 rotates with the hub 79 and shaft 84, conventional wiring arrangements may be used to connect the pickup rings 104 with the electrical contacts of the light source 97.

Also mounted within the casing 76 is a photoelectric cell 106. The cell 106 is a conventional photoelectric cell and may be chosen to meet the requirements of particular installations and the particular light reflection characteristics of the logs being debarked. The pickup or receiver 106 is mounted in any convenient manner upon the stationary member 90 and suitable leads of conventional design may be used to carry the current from the pickup to suitable amplifiers, etc., that are not shown.

In order to supply light from the source 97 to the surface of a log being debarked, a plurality of apertures 107 are cut at intervals in the outer casing 76. Light may therefore pass through these apertures and between the cutters 93 (since they are staggered) and to the surface of a log thereunder. The light or certain portions thereof is reflected from the surface of the log and is received by the pickup cell 106 which is thereby actuated to a corresponding extent and through amplifiers, etc., the depth-control unit D is pivoted a corresponding amount about the axle 40 to vary the positioning of the cutterhead H as required to provide uniform bark removal. Since both the light source 97 and the photoelectric cell 106 might be damaged by flying chips, the apertures 107 may be covered with a transparent safety glass window 108, or a window of suitable transparent plastic such as Plexiglass, etc. The window 108 is annular and is held in position over the apertures 107 by caps 109.

*Cam and micro-switch control for the extent of cutterhead flop-over*

It may be brought out at this time that it is desirable to debark with the apparatus illustrated logs that may vary greatly in diameter. For example, in Fig. 3, the position of the cutterhead and tilt frame is illustrated for logs of three different diameters. A small log L¹ having a diameter of approximately 18", and the position of the cutterhead H and tilt frame F with respect thereto, are illustrated in phantom. Also illustrated in phantom are a log L² and the tilt frame F and cutterhead H with respect thereto. In the same figure an intermediate log L is illustrated in full lines as is the tilt frame and cutterhead when operating on a log of such diameter. It will be noted that in each of the three cases the profiles of the cutters 93 of the cutterhead H substantially coincides with a circumferential arc of the log. In order to make certain that this profile of the cutters 93 will coincide with a circumferential arc of the log regardless of the diameter of the log having the bark removed therefrom, it is important that the pivotal axis of the tilt frame F be carefully related to a vertical longitudinal midplane of the log at the line where the midplane intersects the lower surface of the log. This line appears as a point in Figure 3 and is designated by the letter X. Specifically, the distance of the pivotal axis of the tilt frame F, which extends through the trunnions 30 mounted upon the end members 16 of the carriage C, to the point X must be substantially equal to the average distance between the pivotal axis of the tilt frame F and the cutting surfaces 94 of the cutters 93. Conveniently the midpoint between the cutters 93 may be taken as the rough point. If this relationship is maintained, the length of the tilt frame F or the distance of its pivotal axis from the line at which the vertical midplane of the log bisects the lower surface thereof may be varied as desired. It is, of course, important that the profile of the cutters 93 coincides with a circumferential arc of the surface of the log L so that the corresponding swath of bark removed by the cutting head will represent substantially all of the bark in the swath, and that the cutters will not penetrate the log at any points to undesirable depths and thereby remove valuable wood therefrom.

As has been explained, the angular tilting of the frame F must be changed to acommodate logs having different diameters. It is also necessary that the extent of the flop-over or rotation of the cutter or debarker head H from the cutter "out" position, indicated in full lines in Fig. 3 and designated generally by the letter O, to the cutter "in" position, illustrated in Fig. 3 by broken lines and designated by the letter I, must be varied to correspond with the particular diameter of the log being debarked. Automatic means are provided for accomplishing this result, and the structure is illustrated in Figs. 6, 7 and 8. Essentially the control is provided by regulating the duration of actuation of the flop-over cylinder 63. For this purpose, a cam 110 is carried by a support member 111 mounted upon that trunnion 30 adjacent the upright 34 of the tilt frame F. The cam 110 and support member 111 therefor are independent of the tilt frame F and remain in the position illustrated. The generally arcuate surface of the cam 110 is engaged by a cam roller 112 carried by a cam follower assembly 113. The roller 112 is rotatably mounted upon a plate 114 secured to the end of an arm 115 by cap screws 116. The arm 115 is confined within the position illustrated which is spaced from and substantially parallel with the upright side member 34 of the tilt frame F by means of spaced guides 117 having openings therethrough that slidably receive the arm 115. The guides 117 are rigidly carried by the upright 34 and the arm 115 is normally biased toward a down position in which the cam roller 112 engages the cam surface of the cam 110 by means of a spring 118 secured at one end to a guide 117 and at its upper end to a pin carried by the arm 115.

Referring particularly to Fig. 7, it is seen that at its upper end the arm 115 is connected to a support arm 119 pivotally mounted upon the yoke axle or shaft 40. In Fig. 8 it is noted that the arm 115 and arm 119 are joined by a loose connection provided by an elongated slot 120 in the arm 115 that slidably receives a bearing surface 121 of a cap screw 122 threaded at one end and thereby received within an aperture provided by the support arm 119. Since the support arm 119 is free to rotate about the yoke shaft 40, its position relative thereto will be determined by the axial position of the cam arm 115 as determined by the point of engagement of the roller 112 with the cam 110.

At its outer end the support arm 119 has mounted thereon a microswitch 123 equipped with a movable roller element 124 that is moved to actuate the switch. The element 124 is engaged by a trigger arm 125 carried upon the yoke shaft 40 and secured thereto by a setscrew 126 to prevent rotation therebetween. It is apparent, then, that as the yoke 41 is rotated to flop over the cutterhead H, the yoke shaft 40 will also be rotated as will the trigger arm 125 carried thereby. The extent of engagement of the trigger arm 125 with the trigger element 124 of the microswitch 123 will be determined by the position of the microswitch 123 as determined by the arm 119. Therefore, the cam 110 may be designed so that as the tilt frame F is positioned to accommodate a log of any given diameter, the roller 112 and cam arm 115 will be moved a distance corresponding to the diameter of the log and the relative position of the microswitch 123 will thereby be changed to correspond with the log diameter. Since triggering of the microswitch 123 will deactuate the flop-over cylinder 63, the extent of flop-over is automatically determined and the determination is automatically made to correspond with the diameter of any log.

Micro-switch control for partial rotation of the log

After a swath of bark has been removed from a log on both the down and return movement of the carriage C, the log must be rotated to provide another bark area to be removed by the cutterhead. The extent of log rotation must also be changed as the log diameter varies. The rotational movement of the log is automatically controlled by means of a microswitch 127 having a trigger element 128 actuated by a trigger arm 128 rigidly pinned to the yoke shaft 40 by a setscrew 130. Microswitch 127 is therefore actuated by arm 129 in a manner similar to the operation of switch 123 by arm 125, and thereby limits the rotation of the head as it moves into the "out" position shown in Figure 3. The log rotation will occur when the cutterhead is pivoted or flopped over to the cutter "out" position illustrated in Fig. 1 and designated by the letter O in Fig. 3. It is apparent from the physical relationship of the switch 127 and trigger arm 129 that the greater the rotation of the cutterhead upon the flopover to cutter "in" position, the greater must be the pivotal movement upon the return to cutter "out" position. Therefore the log will have a greater time to rotate before the arm 129 triggers the switch 127 and it is seen therefore that the extent of log rotation is automatically determined without the necessity of control by an operator.

It is also seen in Fig. 7 that the yoke shaft 40 is rotatably supported in the link 42 upon needle bearings 131 and that thrust bearings 132 and 133 are also provided. The thrust bearing 132 on one side thereof engages the link 42 and on the other side a stop collar 134 pinned to the yoke shaft 40 by setscrew 135. The bearing 133 is confined against the link 42 by the yoke 41. At its opposite end the yoke and yoke shaft 40 thereof is supported in a similar bearing arrangement.

Modified cutterhead

In Figs. 11 and 12, a modification of the cutterhead is illustrated. The structure is identical with that previously described except that the casing 76 is not equipped with cutters or knives 93 but instead has mounted thereon a plurality of stiff wire brushes 136a. For mounting the brushes 136a the outer surface of the casing 76 has mounted thereon a plurality of spaced-apart annular flanges 137a. The flanges 137a are equipped at spaced points with pairs of apertures that receive the ends of U-shaped bolts 138a. The bolts 138a are threaded at their ends and receive nuts 139a that draw the U-shaped members tightly against the brushes 136a so as to anchor them to the annular flanges 137a. Preferably the brushes are formed from lengths of wire rope that is relatively stiff and the wire lengths are bent into U-shaped form as is illustrated best in Fig. 11, and adjacent each end of the wire length the wings of the U are confined against the annular flanges 137a by the U-shaped bolt 138a. Preferably the ends of the brushes 136a are frayed and may be cut on an angle so as to provide between the four rows illustrated a generally continuous arc that has a configuration substantially the same as the cylindrical surface of a log. Instead of chipping the bark from the logs the wire brushes operate to shred the bark and provide a fluffy mass that is usable, as removed from the log, as an insulating material.

Hydraulic circuit

Conceivably, power for actuating the various movable parts of the log-barker apparatus described might be provided in a number of different ways. For example, electric motors might possibly be used; but it is preferred that hydraulic motors and cylinders, etc., be employed because of their light weight and low inertia that provides ready control and change of speed economically while at the same time lightweight units can develop relatively large horsepower outputs. In Fig. 9 is illustrated schematically a hydraulic circuit for imparting rotation and movement to the various described elements. The motors employed and the actauting cylinders are all controlled by electrically operated or solenoid valves, whereby actuation and deactuation are thereby readily accomplished from a small unitary control panel. The electric circuitry is standard and solenoid controlled valves are well known in the art, and as a consequence it is believed unnecessary for the purposes of this invention to describe and illustrate such electrical circuit arrangements.

The hydraulic circuit for the log barker is a closed circuit with all of the hydraulic fluid, which may be oil or water, being taken from and returned to the same source—a tank 136. Leading from the tank 136 is a conduit 137 that enters a hydraulic pump 138. The output from the pump 138 is delivered through a conduit 139 to the cutterhead motor 86, and after passing through the motor 86 the fluid is returned through a return conduit 140 to the supply tank 136. If desired, a pressure indicator 141 may be interposed in the line or conduit 139 and be provided with a suitable bypass returning the pressure-indicating fluid back to the conduit 137.

Also coming from the discharge end of the pump 138 is a supply conduit 142 running through a filter 143 and down through a branch conduit 144 to a pressure reducer 145 equipped with a gauge or pressure indicator 146. If desired, a gauge or pressure indicator 147 may be included in the conduit 142 as well as a pressure-relief valve 148 connected through a relief conduit 149 with the supply line or conduit 137. Similarly, the conduit 139 may be equipped with a pressure-relief valve 150 connected to the supply conduit 137.

Leading from the pressure reducer 145 is a flow conduit 151 leading to a solenoid-operated valve 152 connected through a two-way needle valve 153 and needle valve 154 with the tilt-frame cylinder 51. Return from the cylinder 51 is provided through a return passage 155 connecting with a common return passage 160 and into the main return conduit 140. The pressure reducer 145 is also connected through a small return conduit 161 to the common return 160 where it, too, joins the main return conduit 140.

Also connected to the output side of the pressure reducer 145 is a conduit 162 leading through a needle valve 163 to a solenoid-operated valve 164 that is connected to the cutterhead flop-over or rotate cylinder 63. Return from the cylinder 63 is through a conduit 165, back through the valve 164 and to the common return 160.

Also leading from the cylinder 145 through a needle valve 166 is a conduit 167, and the fluid flowing therethrough is delivered through a solenoid-operated valve 168 which is connected to the depth-control cylinder 58. Return from the cylinder 58 is provided through a conduit 169, through the valve 168, and to the common return conduit 160.

The conduit 142 leading from the discharge side of the pump 138 is connected to a flow-control unit 170 that has on outlet 171 leading back to the supply conduit 137 from the supply tank. The main discharge of the flow control unit 170 is through pipe 172 and into a solenoid operated valve 173 and thence into a motor 174 that drives the carriage C. The hydraulic return from the carriage-drive motor 174 is through a passage 175, back through the valve 173 and through a passage 176 and into a return conduit 177 which leads to the supply conduit 137 leading from the supply tank. The motor 174 is also equipped with a second return passage 178 that also leads to the return conduit 177.

The conduit 172 is equipped with a branch 179 that leads to a solenoid-operated valve 180 and thence into the log-rotating motor 181. Return from the motor 181 is through passage 182, back through the valve 180 and into the return 177. A second smaller return is provided through passage 183 which leads back to the return 177.

All of the solenoid-operated valves—152, 164, 168, 173 and 180—are four-way valves and the flow of hydraulic pressure fluid therethrough may be controlled to operate their respective cylinders and motors in either direction. It may be noted that the cutterhead motor 86 is not equipped in this manner and the cutterhead rotates in the same direction at all times.

The hardness and thickness of log bork varies greatly with the particular type of timber, and it is quite common for both the thickness and hardness of the bark to vary considerably throughout the length of any given log. If the bark is particularly thin and soft, for efficient operation the carriage C can move along longitudinally of the log L at a much more rapid speed. Conversely, if the bark is thick and relatively hard, efficient operation of the log barker is achieved if the carriage C is moved along the track at a slower rate of speed when the cutter or debarking head H encounters bark of this character. It is virtually impossible to regulate the carriage speed manually so as to correspond the speed with the character of the bark encountered by the debarking head H at any particular area. Therefore, preferably I employ automatic means for accomplishing this result.

*Automatic carriage-speed control*

The automatic carriage-speed control is illustrated in Fig. 10 and will be described with reference to this illustration. The control illustrated includes a cylinder 184 having mounted for reciprocation therein a plunger 185 equipped with an enlarged piston 186 that engages the inner walls of the cylinder 184 in fluid-tight relation. A bracket 187 is shown for purposes of mounting the cylinder. The plunger 185 carries at its outer end a cone-shaped limiting member 188 that is hollowed out interiorly and receives therein the end of a lever 189 equipped at its end with a roller 190. At its opposite end the lever 189 is pivotally connected to an arm 191 by means of a bifurcated connector member 192. Similarly, the lever 189 is connected by means of a bifurcated connector member 193 to an arm 194. The arms 191 and 194 are connected at their lower ends respectively with movable foot-control members 195 and 196. The control members 195 and 196 are adapted to be depressed by the feet of the log-barker operator and it is apparent that hand-operated controls will operate suitably and may be interchanged with the members 195 and 196.

Intermediate its ends the lever 189 is fulcrumed by a clevis 197 rigidly carried on a valve casing 198. The valve 198 is a four-way valve and is equipped with a movable valve member provided with a plunger 199. The plunger 199 is mounted for reciprocation within the valve casing 198 and is secured by means of a bifurcated connector 200 to the lever 189. It is apparent that depression of either of the control members 195 and 196 will pivot the lever 189 about the fulcrum 197 with the result that the valve plunger 199 will be withdrawn from the casing 198, or pushed further thereinto, depending upon which of the arms 191 or 194 is moved downwardly. It is also apparent that the extent of movement of the lever 189 is determined by its relative position with respect to the cone-shaped limiting member 188. In the position illustrated in Fig. 10, the lever 189 may pivot through a wide arc while if the cone-shaped member 188 is moved to the left the lever 189 can pivot through only a small arc determined by the distance between the opposite walls of the cone-shaped member.

The position of the cone-shaped member 188 is determined by the position of the piston 186 within the cylinder 184. The position of the piston 186 in turn is established by the pressures exerted against opposite sides thereof by the fluid within the cylinder. Adjacent its end the cylinder 184 is connected through conduit 201 with the cutterhead or debarking-head motor 86. The result is that the pressure of the fluid within the motor 86 is present at the end of the cylinder 184 and is exerted against one side of the piston 186. The cylinder 184 is also connected through conduits 202 and 203 to the source of fluid pressure and the connection may be made at any place beyond the discharge side of the pump 138.

During normal operation of the cutter head motor 86, a mean pressure will be developed therein and this pressure will be exerted against the piston 186 and at the same time the pressure of the fluid source will be exerted against the opposite side of the piston 186 through the conduits 202 and 203. A state of equilibrium is maintained if these pressures are equal, and the position of the cone-shaped member 188 will thereby be determined. If the bark in any particular area of a log is excessively hard, the rotating speed of the debarking head H will be reduced with the result that there will be a pressure increase within the motor 86. The piston 186 will thereby be moved to the left and the arc through which the lever 189 may move will be substantially reduced. On the other hand, if the bark encountered by the debarking head H is particuluarly soft, the speed of the debarking head will increase as a consequence and the pressure within the motor 86 will be reduced. The pressure of the fluid within the conduits 202 and 203 will thereby be in excess of the pressure within the conduit 201 and the piston 186 will move to the right. The lever 189 may therefore be pivoted through a larger arc. A solenoid-controlled valve 204 is connected in the conduit 202 and leads through a conduit 205 back to the supply tank 136. The valve 204 can function both as a relief valve and as a means for establishing the pressure within the conduits 202 and 203.

The valve 198 controls the flow of pressure fluid to the carriage motor 174. In the schematic illustration of Fig. 9 the valve 198 may be used to replace the valve 173. In such case the valve 198 would be connected to the carriage motor 174 through the conduits 175 and 172a and to the source of pressure fluid through the conduit 172. The conduit 176 would also connect the valve 198 to the tank 136, as indicated in Fig. 9.

It is seen, then, that if the operator has depressed the control 196 until the roller 190 abuts the wall of the cone-shaped member 188 and the carriage is thereby moving at a predetermined speed because of the valve opening provided by the depressing of the plunger 199, if the character of the bark encountered by the debarking head H changes considerably, the piston 186 and cone-shaped member 188 will move either to the right or left, depending upon the change in the bark character, and the roller 190 riding against the side or wall of the cone-shaped member 188 will either be raised or lowered so that the lever 189 will be pivoted about the fulcrum 197 to change the positioning of the plunger 199 and thereby alter the flow of pressure fluid to the carriage motor 174. The speed of the carriage motor will therefore be increased or decreased as the case may be and the traversing speed of the debarking head is automatically regulated to fit the character of the log bark in any particular area.

*Operation*

In operation, a log L will be placed upon the chains 10 provided by the log support A. The operator through actuation of the solenoid-controlled valve 152 will energize the cylinder 51 to pivot the tilt frame F about its pivotal axis so as to bring the debarking head H into proximity with the bark B of the log. The angular position of the debarking head H will always be the same, for in the position illustrated in Fig. 1 the positioning of the head is determined by the limit in one direction of the flop-over piston and cylinder 63. Because of the peculiar relation between the mean distance of the cutters of the debarking head H from the pivotal axis of the tilt frame F and the distance between the pivotal axis of the tilt frame and the vertical longitudinal midplane of the log L supported upon the chains 10, the cutting profile of the debarking head or cutterhead H will always coincide with a circumferential arc of the log L.

The exact position of the tilt frame F and debarking head H relative to the log L will be determined by the angular adjustment of the depth control D and this in turn will provide the depth of cut made into the log by debarking head H. Initially the depth-control wheel 49 will extend beyond the left end of the log L as viewed in Fig. 1, and the closeness of the head H to the log will depend solely upon the operator's actuation of the cylinder 51. However, after the operator has energized the cutterhead motor 86 so as to rotate the head H and the carriage motor 174 is energized so as to move the carriage along the track T, a swath of bark will be removed from the log by the cutter head as the carriage moves to the right and the depth-control wheel 49 will ride upon the log surface as is illustrated in Fig. 1. At this time, the operator will energize the cylinder 58 to adjust the angular disposition of the arm 46 relative to the tilt frame F to determine the exact depth of bark material to be removed by the debarking head H. The depth-control wheel 49 and depth-control assembly associated therewith provides a very accurate control of the depth of bark removed from a log and at the same time enables substantially all of the bark to be removed without danger of removing excessive amounts of valuable wood from the log. The reason for this is that the changes in log contour are quite gradual longitudinally of a log and the depth control D is sufficiently responsive to such gradual changes so as to constantly reposition the cutterhead to accomplish the desired removal.

After the carriage C has completely traveled the length of the log L and slightly therebeyond, the operator energizes the valve 164 to actuate the cylinder 63 and the debarking head H is provided or flopped over to the cutter "in" position illustrated in Fig. 3 by broken lines. The direction of the carriage motor rotation is reversed and the carriage C travels along the track T in an opposite direction so that the debarking head H removes another swath of bark from the log and without the necessity of the log being rotated. The extent of the pivoting or flop-over movement of the cutterhead or debarking head H is determined by the cam and switch assembly illustrated in Figs. 6 through 8 and previously described in detail. Therefore the operator need not be concerned with attempting to adjust the position of the debarking head H relative to the log so as to maintain it tangent thereto. After the carriage C has completely traversed the length of the log L and has returned to its initial position, the debarking head H is again flopped over to the cutter "out" position shown in Fig. 1 and the operator also actuates the solenoid-controlled valve 180 to energize the log-rotating motor 181 so that the log is rotated to provide a new area of bark for removal by the debarking head H. The amount of rotation of the log L is automatically determined by the cam and switch arrangement, also illustrated in Fig. 7 and previously described. Therefore all of the bark is readily removed from a log without the debarking head H overlapping a previous swath in each pass that it makes.

If the light-sensitive or photoelectric cell arrangement shown in Fig. 5 is used to establish the debarking-head depth adjustment, the operation is substantially as heretofore described except that the photoelectric cell arrangement provides the means for adjusting the debarking head so that the depth of bark removed corresponds to the amount of bark present, since the latter may vary because of contour changes in the log being debarked. There is substantial difference in the color of bark, the wood itself and the area of the timber between the bark and wood. It is therefore possible to provide photoelectric means and associated controls therefor that are sensitive to changes in the color of the timber layers because of the changes in light reflection that accompany changes in the timber color.

The automatic carriage-speed control means operates in the manner before described, to regulate the carriage speed to the particular character of the bark being encountered by the debarking head H at any given time. Thus with a retardation of carriage speed, an area of bark encountered by the debarking head H is subjected to its action for a greater period of time, with the result that such bark areas are more thoroughly removed than would be the case if the speed of the carriage was constant irrespective of bark hardness or softness.

The debarking head H when equipped with the spaced rows of staggered cutters or knives removes the bark in chipped form that may be directly used in chemical extraction processes without further treatment and without the danger of the filters, etc., employed in the processes becoming clogged by excessively fine particles such as the dust produced by a saw. This is an important result because the chemicals are very valuable (as for example, the wax obtained from Douglas fir) and are even more valuable when the extraction processes are rendered less expensive. If the wire brushes illustrated in the modification of Figs. 11 and 12 are substituted, the bark is also removed readily but in shredded form and may be directly used for forming insulation. The bark of California redwood is frequently used for this purpose.

The apparatus illustrated and described is light in weight and is easily portable. Though electric motors, etc., might be used for powering the equipment, the preferred hydraulic motors, cylinders, etc., contribute to the light weight and portability of the log-barking apparatus. At the same time, though light in weight the equipment operates rapidly and conveniently and is capable of debarking logs of various sizes without wasting any of the valuable wood, and in sufficient quantities to maintain continuous operation of a lumber mill of fairly substantial size.

While in the foregoing specification I have set forth specific embodiments of my invention in great detail for purposes of illustration, it will be apparent that those skilled in the art may change the details considerably without departing from the function of my invention.

I claim:

1. In a log barker, a frame, a debarking head rotatably mounted thereon, said head having a cylindrical casing equipped with a plurality of knives extending radially therefrom and oriented in spaced circumferential rows, said knives also being staggered and angularly disposed relative to said head so that the cutting edges of said knives, when a profile is taken thereof along a longitudinal line on said casing substantially parallel to the rotational axis of said head with a knife in each row assumed to be positioned on said line, form a generally arcuate configuration, whereby upon operation of said log barker, a swath of bark is chipped from a log, and means for adjustably controlling the angular position of said frame for setting the depth of cut made by said knives.

2. In apparatus for debarking logs, a frame, a debarking head equipped with means for removing bark from a log and being mounted upon said frame for rotation, means for rotating said head, means providing relative movement between a log being debarked and said head, said debarking head also being pivotally mounted upon said frame to provide selective engagement with a log along adjacent areas thereof, and power means for pivoting said head from one to the other of the log-engaging positions.

3. In a log debarker or the like, a frame, a debarking head rotatably mounted upon said frame and being equipped with members operative to remove bark from a log during the rotation of said head, power means for rotating said head, means providing relative movement between a log being debarked and said head longitudinally of such log, said debarking head being also pivotally mounted upon said frame to provide selective engagement of the head with a log along contiguous longitudinal areas thereof, and power means for pivoting said head from one to the other of such contiguous log areas capable of being engaged thereby, whereby two swaths of bark can be removed from a log without rotation thereof relative to said head.

4. The structure of claim 3 wherein said frame is mounted upon a carriage, and power means are provided to move said carriage longitudinally of a log being debarked and substantially parallel thereto.

5. The structure of claim 4 wherein switch means are provided to deactuate said power means for pivoting said head to limit the pivotal movement thereof in one direction.

6. The structure of claim 5 in which said frame is pivotally mounted upon said carriage to provide adjustment of said head relative to a log being debarked to accommodate logs of different diameter, and said means for limiting the pivotal movement of said head includes a cam and cam follower automatically positioned upon pivotal adjustment of said frame so that the limited pivotal movement of said head varies in accordance with the diameter of a log being debarked.

7. In apparatus for debarking logs, a support adapted to carry a longitudinally-disposed log thereon, a carriage mounted near said support, a frame pivotally mounted upon said carriage for swinging movement toward and away from a log carried upon said support, power means for pivoting said frame, and a rotatable debarking head mounted upon said frame, bark-removing members mounted on said head and configured to provide an arcuate bark-removing profile upon rotation of the head for removal of bark from a supported log, the mean distance of the bark-removing profile from the pivotal axis of said frame being substantially equal to the distance from a vertical longitudinal midplane of a support-carried log at the line where it intersects said support to the pivotal axis of said frame, with the result that upon pivoting of said frame to move the debarking head into operative relationship with a support-carried log, said bark-removing profile will substantially coincide with a circumferential arc of a support-carried log automatically and irrespective of such log's diameter.

8. In a log barker, a track, a carriage adapted to ride upon said track, a frame pivotally mounted upon said carriage, a debarking head rotatably mounted upon said frame, means for pivoting said frame to bring the head carried thereby into bark-removal relation with a log extending along said track, means for controlling the depth of bark material removed from such log by said head by controlling the proximity of the frame to such log and including an adjustable depth control member carried by said frame and adapted to abut a peripheral surface of a log and thereby establish the frame positioning, and means for moving said carriage along said track, whereby, said depth control member and said debarking head are moved longitudinally with respect to such log.

9. In a log barker, a carriage, a frame pivotally mounted upon said carriage, a debarking head rotatably mounted upon said frame, means for pivoting said frame to bring the head carried thereby into bark-removal relation with a log, means providing relative longitudinal movement between said carriage and a log being debarked, and means for controlling the depth of bark material from a log by said head by controlling the proximity of the frame to such log, said last-mentioned means including an arm pivotally mounted intermediate its ends upon said frame and equipped at one end with a rotatable wheel adapted to engage the periphery of a log, and power means having a stationary element secured to said frame and a movable element secured to said arm adjacent the free end thereof, whereby actuation of the movable element adjusts the positioning of said arm and the wheel carried thereby relative to said frame to establish the position of said frame relative to a log.

10. In log debarking apparatus, a carriage, a frame pivotally mounted upon said carriage, means providing relative movement between said carriage and a log being debarked, a debarking head rotatably mounted upon said frame, means for rotating said head, said head providing a cylindrical casing having a plurality of spaced-apart apertures therethrough, a light source in said casing and arranged to project light through some of said apertures and onto the surface of a log being debarked, a light-sensitive device mounted in said casing in shielded relation with said light source and arranged to receive light reflected through other of said apertures from the log surface, power means for pivoting said frame to bring said head carried thereby into bark-removal relation with a log, and control means responsive to the light sensitivity of said device to control said power means and thereby regulate the position of said frame and head relative to such log.

11. In a log barker, a carriage, a frame mounted upon said carriage, a debarking head rotatably mounted upon said frame and operative upon rotation thereof to remove bark from a log, power means for rotating said head, power means for moving said carriage longitudinally of a log to carry said head thereacross, control means arranged with both of said power means and responsive to changes in the operating condition of said head when bark of differing hardness and thickness is encountered thereby to reduce the speed of movement of said carriage when bark of greater hardness and thickness is encountered by said head and to increase the speed of said carriage when bark of lesser hardness and thickness is encountered by said head.

12. A log barker, comprising a track, a carriage mounted upon said track for longitudinal movement, a log support adapted to receive thereon a longitudinally disposed log, means for moving said carriage upon said track, a tilt frame pivotally mounted upon said carriage, power means for tilting said frame to adjust the same with reference to the diameter of a log supported upon said log support, a debarking head rotatably mounted upon said frame and being equipped with a plurality of bark-engaging members adapted to remove bark from a log, power means for rotating said head, depth-control means arranged with said frame for determining the proximity of the frame to a log supported upon said log support to provide control of the depth of bark removed from a log by said debarking head, said debarking head also being pivotally mounted upon said frame and adapted for movement between contiguous longitudinal bark areas upon the termination of movement of said carriage at each end of said track, and power means for swinging said head between the two positions of adjustment.

13. A log barker, comprising a log support adapted to receive thereon a longitudinally disposed log, said support having moveable members receiving a log and adapted upon movement to rotate a log, power means for moving said members, a track, a carriage mounted thereon for longitudinal movement, power means for moving said carriage in both longitudinal directions upon said track to provide relative movement between said carriage and a log carried by said log support, a tilt frame pivotally mounted upon said carriage, a debarking head rotatably mounted upon said frame and having a plurality of bark-removing members, the pivotal axis of said tilt frame being so positioned that the mean distance therefrom to the bark-removing members of said debarking head is substantially equal to the distance from the pivotal axis to a vertical longitudinal midplane of a log carried upon said log support at the line where said plane intersects the log support, power means for rotating said debarking head, power means for pivoting said tilt frame upon said carriage to bring the bark-removal members of said debarking head into operative engagement with the bark of a log carried by said log support, a depth control arranged with said tilt frame for adjusting the angular disposition thereof to establish the precise operative engagement of said bark removal members with the bark of a log on said log support, said debarking head also being pivotally mounted upon said frame for selective movement between "in" and "out" positions wherein said head selectively engages contiguous longitudinal bark areas, power means for pivoting said head between its two positions of adjustment, and control apparatus in combination with the power means providing rotation of said head and the power means providing movement of said carriage that is responsive to the operative characteristic of said head as altered by the relative hardness and softness of bark engaged by the bark-removal members thereof to regulate the velocity of movement of said carriage selectively in response to the hardness and the softness of such bark at any particular area.

14. In a log barker, a frame, means providing relative movement between said frame and a log along the longitudinal axis of such log, a debarking head rotatably mounted upon said frame, said head being provided with a plurality of spaced and radially extending cutting members arranged in circumferential rows thereon, said members providing arcuate cutting ends and being mounted so that the profile of said members forms an arcuate line substantially coinciding with a circumferential arc of such log, whereby, a swath of bark is removed from such log by said cutting members as said head is rotated, and means for adjustably controlling the angular position of said frame for setting the depth of cut made by said cutting members.

15. The structure of claim 14 in which said cutting members comprise a plurality of stiff brushes extending radially from said head.

16. The structure of claim 15 in which said head is provided with a cylindrical casing, and said brushes are formed of wire rope links having frayed ends and being fixedly secured to said casing.

17. In an apparatus for debarking logs, a frame, a debarking head rotatably mounted upon said frame and equipped with a plurality of brushes extending radially therefrom for removing bark from a log, means for rotating said head, means providing relative movement between a log being debarked and said head, said debarking head also being pivotally mounted upon said frame to provide selective engagement of said brushes with a log along adjacent areas thereof, and power means for pivoting said head from one to the other of the log-engaging positions.

References Cited in the file of this patent

UNITED STATES PATENTS

| | | |
|---|---|---|
| 176,709 | Thompson | Apr. 25, 1876 |
| 1,379,768 | Larson | May 31, 1921 |
| 1,881,465 | Ganes et al. | Oct. 11, 1932 |
| 2,055,108 | Hokonson | Sept. 22, 1936 |
| 2,401,500 | Ockfen | June 4, 1946 |
| 2,576,967 | Pauley et al. | Dec. 4, 1951 |
| 2,591,751 | Whitlock | Apr. 8, 1952 |
| 2,608,223 | Ecklund et al. | Aug. 26, 1952 |
| 2,646,092 | Kolpe et al. | July 21, 1953 |
| 2,653,635 | Denison | Sept. 29, 1953 |

FOREIGN PATENTS

| | | |
|---|---|---|
| 635,417 | France | Dec. 27, 1927 |
| 597,217 | Germany | May 18, 1934 |
| 126,001 | Sweden | Sept. 6, 1949 |